United States Patent
Michel

(10) Patent No.: US 9,501,811 B2
(45) Date of Patent: Nov. 22, 2016

(54) RESIZING AN IMAGE

(71) Applicant: Dassault Systemes, Velizy Villacoublay (FR)

(72) Inventor: Fabrice Francis Michel, Montrouge (FR)

(73) Assignee: Dassault Systemes, Velizy Villacoublay (FR)

( * ) Notice: Subject to any disclaimer, the term of this patent is extended or adjusted under 35 U.S.C. 154(b) by 15 days.

(21) Appl. No.: 14/564,763

(22) Filed: Dec. 9, 2014

(65) Prior Publication Data

US 2015/0178889 A1 Jun. 25, 2015

(30) Foreign Application Priority Data

Dec. 20, 2013 (EP) .................................... 13306825

(51) Int. Cl.
*G06K 9/32* (2006.01)
*G06T 3/40* (2006.01)
*G06T 3/00* (2006.01)
*G06K 9/46* (2006.01)

(52) U.S. Cl.
CPC ............... *G06T 3/40* (2013.01); *G06K 9/4604* (2013.01); *G06T 3/0012* (2013.01)

(58) Field of Classification Search
None
See application file for complete search history.

(56) References Cited

U.S. PATENT DOCUMENTS

2010/0124371 A1  5/2010  Jiang et al.
2012/0121204 A1  5/2012  Ding et al.

OTHER PUBLICATIONS

Wang et al., "Optimized Scale-and-Stretch for Image Resizing," ACM Transactions on Graphics, vol. 27 (5): 1-8 (Dec. 1, 2008).*
Wang, Yu-Shuen, et al., "Optimized Scale-and-Stretch for Image Resizing," *ACM Transactions on Graphics*, vol. 27 (5): 1-8 (Dec. 1, 2008).
Chuang, Cheng-Hung, et al., "Target-preserving Content-aware Image Resizing," *IEEE 2012 Sixth International Conference on Genetic and Evolutionary Computing*, pp. 19-22 (Aug. 25, 2012).
Sun, Jin, et al., "Scale and Object Aware Image Retargeting for Thumbnail Browsing," *2011 IEEE International Conference on Computer Vision*, pp. 1511-1518 (Nov. 6, 2011).
European Search Report for Application No. 13306825.4 dated Jun. 16, 2014.

* cited by examiner

*Primary Examiner* — Feng Niu
(74) *Attorney, Agent, or Firm* — Hamilton, Brook, Smith & Reynolds, P.C.

(57) ABSTRACT

The invention notably relates to computer-implemented method for resizing an image I. The method comprises the steps of: providing the image I to resize; and providing an image significance by computing a significance of each pixel in the image to resize. An original spatial domain ($\Omega$) of the significance image is extracted. A transformation $T_\theta$, parameterized as an interpolating spline by a set of control points, is provided from $\Omega$ to a resized spatial domain $\Omega'$; subdividing $\Omega$ into cells, each cell being defined by a subset of control points of the set. For each cell, a weighted average of the significance of the pixels in the cell is computed, the weighted average being computed using the interpolating spline. The cells of $\Omega$ are deformed by displacing one or more control points of the cells having a lesser weighted average. The transformation $T_\theta$ over a spatial domain of the image I is computed using the displaced one or more control points. A resized image J is computed by applying the computed transformation $T_\theta$ to the spatial domain of the image I to resize.

19 Claims, 6 Drawing Sheets

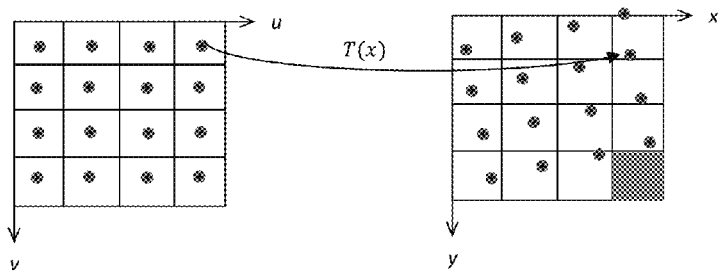
FIG. 7
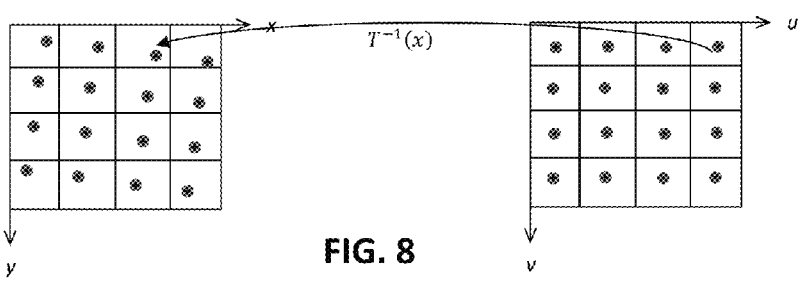
FIG. 8
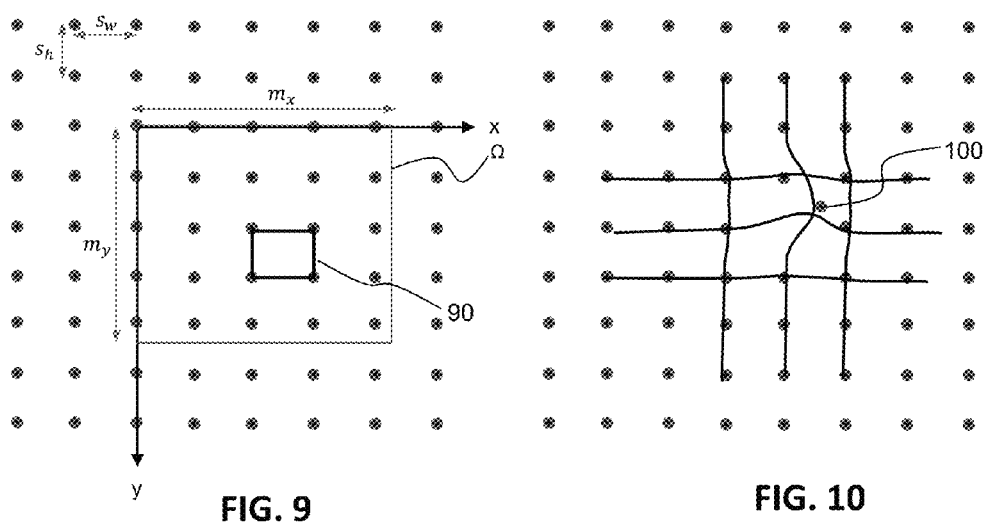
FIG. 9     FIG. 10

RESIZING AN IMAGE

RELATED APPLICATION(S)

This application claims priority under 35 U.S.C. §119 or 365 to European Application No. 13306825.4, filed Dec. 20, 2013.

The entire teachings of the above application(s) are incorporated herein by reference.

FIELD OF THE INVENTION

The invention relates to the field of computer programs and systems, and more specifically to a method, system and program for resizing an image.

BACKGROUND OF THE INVENTION

Content aware image retargeting is related to image processing in which an image is resized according to its content. The image size is changed without removing pixels of the image (as opposed to image cropping) or without distorting the relevant content (as opposed to image scaling wherein the pixel size is reduced).

In Seam carving for content-aware image resizing (Avidan and Shamir, in proceeding of SIGGRAPH '07 ACM SIGGRAPH 2007, Article No. 10) vertical and horizontal lines of adjacent pixels are removed from the image thus reducing the size of the image. Augmentation in the image size is done by adding lines of adjacent pixels. The computation of an image significance cost is carried out in order to drive the algorithm and to tell the algorithm which line of adjacent pixels to remove.

However, seam carving may produce artifacts in the image since when a vertical line is removed only one pixel per row in the image is removed. This removal creates discontinuities in the image that are characteristic of this kind of method.

The removal of one or a group of pixels at once characterizes Discrete transformation methods. However, these Discrete transformation methods all suffer from the same flaw; they generate serious artifacts due to the discontinuities generated by the removal or the aggregation of pixels that were not contiguous in the first place.

Discrete transformation methods are opposed to Continuous transformation methods in which a continuous mathematical function assigns new positions to the pixels, and since the positions are not always integral positions while the positions of pixels in an image represented inside the memory of a computer is always an integer, interpolation (linear, quadratic . . . ) is required to recover the image. The known Continuous transformation methods generally deal with a continuous transformation that is applied to the image through interpolation.

However these transformations are merely an affine shrinkage inside cells that are defined on the image, and as such, the transformation is only piecewise smooth across the image which can also create artifacts, especially on the edges of the cells. These methods also need an explicit account for fold overs, namely when the transformation gets wrapped around itself and pixels are simply disappearing from the image resulting in displeasing visual results.

Within this context, there is still a need for an improved method for resizing an image.

SUMMARY OF THE INVENTION

It is therefore provided a computer-implemented method for resizing an image I. The method comprises the steps of:
a) providing the image I to resize;
b) providing an image significance by computing a significance of each pixel in the image to resize;
c) extracting an original spatial domain of the significance image;
d) providing a transformation $T_\theta$, parameterized as an interpolating spline by a set of control points, from the original spatial domain to a resized spatial domain;
e) subdividing the original spatial domain into cells, each cell being defined by a subset of control points of the set;
f) computing, for each cell, a weighted average of the significance of the pixels in the cell, the weighted average being computed using the interpolating spline;
g) deforming the cells of the original spatial domain by displacing one or more control points of the cells having a lesser weighted average;
h) computing the transformation $T_\theta$ over a spatial domain of the image I using the displaced one or more control points; and
i) computing a resized image J by applying the computed transformation $T_\theta$ to the spatial domain of the image I to resize.

The method may comprise one or more of the following:
a) the provided transformation $T_\theta$ is a diffeomorphic transformation $T_\theta$ such that $J(x)=I(T_\theta^{-1}(x))$, wherein I is the image to be resized, J is the resized image, x is the position of a given pixel in the original spatial domain ($\Omega$);
b) the diffeomorphic transformation $T_\theta$ is defined by the equation $T_\theta=x+u_\theta(x)$, wherein x is the position of a given pixel in the original spatial domain ($\Omega$), and $u_\theta(x)$ is a displacement function wherein u is a mapping from the original spatial domain ($\Omega$) to the resized spatial domain ($\Omega'$);
c) the transformation $T_\theta$ is parameterized as a free form deformation interpolating spline, and wherein displacement function $u_\theta(x)$ is defined by the equation $$u_\theta(x) = \sum_{k=0}^{3}\sum_{l=0}^{3} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right) \theta\left(\frac{x_w}{s_w}+k, \frac{x_h}{s_h}+l\right),$$

wherein $B^0, B^1, B^2, B^3$ are Cubic B-splines functions, $\theta$ is a function representing the control points, $s_w$ is the spacing between two control points in an horizontal direction, $s_h$ is the spacing between two control points in a vertical direction, $x_w$ is the position of a pixel in the original spatial domain ($\Omega$) on an horizontal axis, $x_h$ is the position of a pixel in the original spatial domain ($\Omega$) on a vertical axis;
d) the set of control points form a grid and $\theta$ is the function representing the grid of control points;
e) the step of computing, for each cell, a weighted average of the significance of the pixels in the cell is carried out with the function $$SI(y) = \sum_{k=0}^{3}\sum_{l=0}^{3} \int_{\Omega_{(i,j)}} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right) S(x)\,dx,$$

wherein $\Omega_{(i,j)}$ is a partition of the original spatial domain ($\Omega$), $S(x)$ represents the provided significance image;

f) the partition $\Omega_{(i,j)}$ is the domain covered by the cells;

g) the original spatial domain ($\Omega$) extracted from the significance image is the same as the spatial domain ($\Omega$) of the image I to resize;

h) the step of computing a resized image J comprises reducing or increasing the image size.

It is further provided a computer program comprising instructions for performing the method.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Embodiments of the invention will now be described, by way of non-limiting example, and in reference to the accompanying drawings, where:

FIG. 7 shows an example of forward mapping transformation;

FIG. 8 shows an example of backward mapping transformation;

FIG. 9 shows an example of B-spline interpolation grid;

FIG. 10 shows an example of the effect of displacement of a control point of B-spline interpolation grid;

DETAILED DESCRIPTION OF THE INVENTION

A description of example embodiments of the invention follows.

Figure 1:
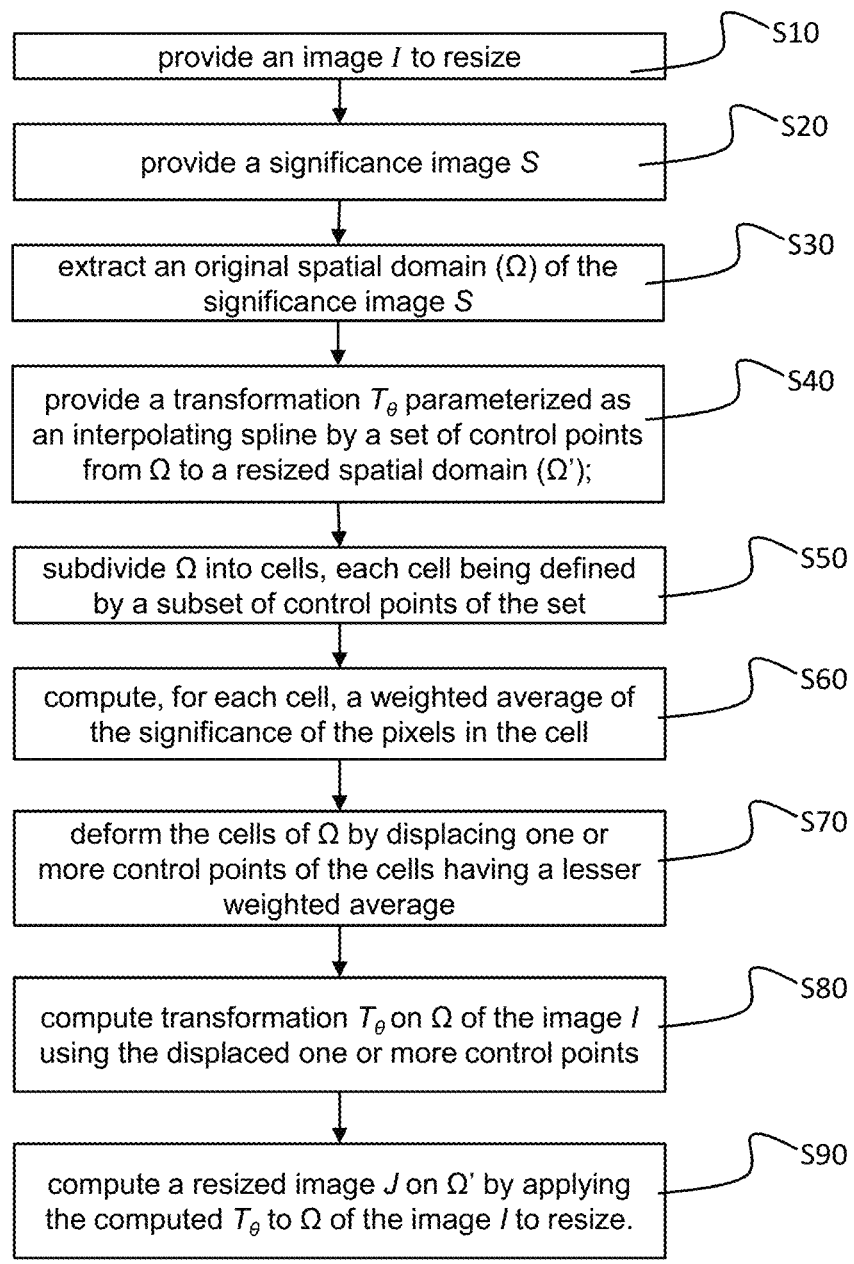
FIG. 1 shows a flowchart of an example of the method.

With reference to the flowchart of FIG. 1, it is proposed a computer-implemented method for resizing an image I. The method comprises a step of providing the image I to resize. The method further comprises computing a significance of each pixel in the image I to resize and providing an image significance. The image significance describes pixel by pixel the significance of the image I to resize. The method also comprises extracting an original spatial domain ($\Omega$) of the significance image. The method further comprises providing a transformation, noted $T_\theta$, parameterized as an interpolating spline by a set of control points. The transformation is a mapping from the original spatial domain ($\Omega$) to a resized spatial domain ($\Omega'$). In addition, the method comprises subdividing the original spatial domain ($\Omega$) into cells. Each cell being is defined by a subset of control points of the set. The method further comprises computing, for each cell, a weighted average of the significance of the pixels in the cell. The weighted average is computed using the interpolating spline. The method also comprises deforming the cells of the original spatial domain ($\Omega$) by displacing one or more control points of the cells having a lesser weighted average. Moreover, the method comprises computing the transformation $T_\theta$ over a spatial domain of the image I to resize using the displaced one or more control points. The method further comprises computing a resized image J on the resized spatial domain ($\Omega'$) by applying the computed transformation $T_\theta$ to the spatial domain of the image I to resize.

Such a method improves the resizing of an image by preventing any fold-over in the image and avoiding artifacts that may appear. In addition, the method provides resized images that are more easily compressible using standard compression algorithm. Indeed, the parameters of the transformation $T_\theta$, which is applied on the image I to resize, define a global transformation that is controlled locally with the set of control points of the interpolating spline. The transformation is continuous, invertible, and the derivate of the transformation is also continuous and invertible. Therefore, the present invention produces smoother transformation in images that will appear more natural to the human eye because the properties of the transformation prevent any fold-over in the image and avoid artifacts that may appear on the cells edges. In addition, the images resized according to the invention are more easily compressible by standard compression algorithms (for instance JPEG, JPEG2000) that heavily rely on discontinuities to characterize an image: the more discontinuities an image has, the larger the compressed file will be. Thus, by limiting discontinuities in the image derivatives, higher compression rates can be used.

The method is computer-implemented. This means that the steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement the user's wishes. In examples, this level may be user-defined and/or pre-defined.

For instance, the step of providing the image I to resize may be performed upon user action, that is, the user selects an image to be resized. The selection may be performed as known in the art, e.g. may carry out the selection via a haptic device such as keyboard, a mouse, a stylus, a touch screen, or the like. For instance, in a two-button mouse, the left button could be used for selecting the image. The system may also identify by default an image, i.e. without requiring user selection.

A typical example of computer-implementation of the method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (eg. one for the program, and possibly one for the database).

Figure 17:
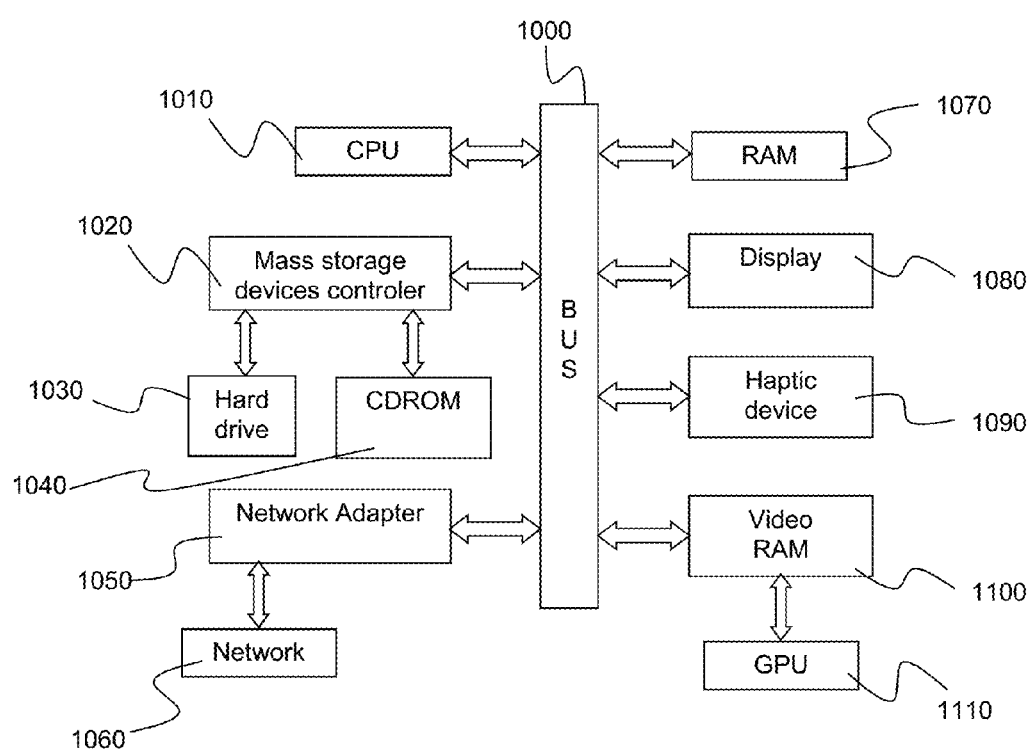
FIG. 17 shows an example of a computer system for carrying out the method according to the invention.

FIG. 17 shows an example of a computer system a processor coupled to a memory. The processor may be coupled to a graphical user interface, e.g. for displaying the resized image.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Referring back the flowchart of FIG. 1, at step S10, an image I to resize is provided. Providing an image (e.g. the image I to resize) means that the image is available to the system performing the method according to the invention. For instance, the image may be temporarily stored in a memory of a computer, and accessed by a computer program, executed by the computer, comprising instructions for performing the method. Said otherwise, step S10 is an input of the image I to resize. The image may be or not displayed to the user, e.g. on display 1080 of FIG. 17.

An image may be of, but is not limited to, vector or raster format. In the event the image is of raster format, the method according to the invention can be directly carried out on the bitmap pixel array. In the event the image is of vector format, the image to resize is converted to raster format on which the method according to the invention is carried out.

For the sake of explanation only, a mathematical definition of an image is now discussed. An image is a mapping from a spatial domain $\Omega$ (the spatial domain $\Omega$ being of dimension d) to V that is the space of image values (V is of dimension c). No assumption on the nature of $\Omega$ or V is taken in order to define an image in its most general meaning.

For instance, a two-dimensional (2D) image I of dimension m by n, which spans 256 shades of gray in a computer memory can be defined as a mapping (equation 1):

$$I:\Omega=[[0,\ldots,m-1]]\times[[0,\ldots,n-1]]\rightarrow V=[[0,\ldots,255]]$$

$$x\in\Omega \mapsto I(x)\in V$$

In this example, the spatial domain $\Omega$ is of dimension d=2 and the space of image values V is of dimension c=1. The 2D image can be considered as a discrete image as it is defined on a discrete spatial domain $\Omega$. This is opposed to continuous images that are defined on a spatial domain $\Omega$ of the form: $\Omega=\mathbb{R}^d$.

Discrete transformations usually refer to transformations that act on discrete images, while continuous transformations act on continuous images. Since only a discrete image space can be represented in the computer's memory, numerical methods such as interpolation are used to compute the values of the image in integer positions ($[[0,\ldots,m]]\subset\mathbb{R}$), as known in the art.

At step S20, image significance S of the image I is provided by computing a significance of each pixel in the image I to resize. The image significance is defined as a cost associated with each pixel of the image. This cost is directly linked to the amount of information the pixel conveys. The amount of information conveyed by a pixel may be, but is not limited to, the relevance of the pixel in the image, e.g. the relevance may be determined by the user. The significance of a pixel of the image I quantifies the importance of the pixel for the integrity of the image. Hence, the image significance of image I shows the pixels in image I that convey greater information than others.

Figure 3:
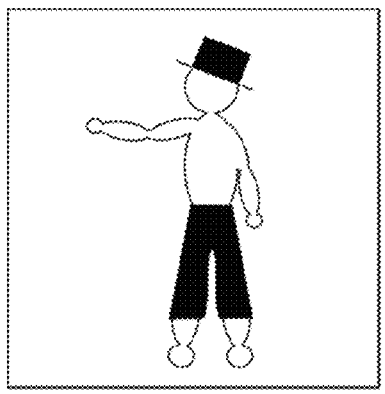
FIGS. 3 and 4 show an example of the image significance computation.

For instance in FIG. 3, reducing the white zones on the left and the right of the character will not change the visual understanding of the scene: indeed, the onlooker will gather the same information from either image of FIG. 3 and one in which the white regions are reduced. Ideally image significance will have higher values in areas where the content cannot be tempered with without a major alteration of the visual appearance.

In practice, the image significance is itself represented as an image. Furthermore, the spatial domain of both the image and the significance image are the same; in other words, the pixel locations in both images represent the same spatial positions.

The value assigned to each pixel of the significance image represents the amount of information conveyed by a pixel. This is as illustrated on FIG. 4 that shows the significance image obtained from the image of FIG. 3: in FIG. 4, the darker areas represent high informative content areas. The representation of the significance image allows easily comprehending that all white areas can be reduced without impacting largely the image global informative power.

Figure 4:
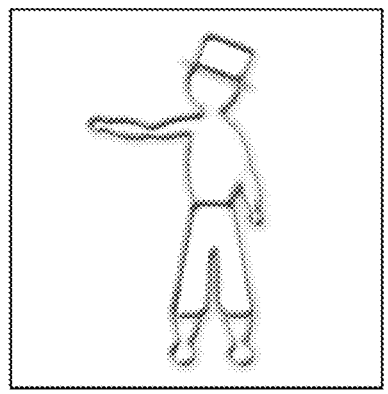

Any image significance computation methods known in the art can be used. For instance, one of the most basic ways to compute image significance may be used: a smoothed out version of the image gradient norm wherein the smoothing is done using 2D Gaussian filters. FIG. 4 displays the image of FIG. 3 on which the gradient norm of image has been smoothed. As another example of image significance computation, image saliency computation may be used. Image saliency aims at finding relevant parts of an image for image segmentation. Interestingly, image significance may also be computed by using the motion information when the images are not static but dynamic, e.g. as is the case in a video. This is particularly useful when retargeting videos, to maintain time coherence between the retargeted frames of the video. The motion information is usually coded as the optical flow of the image and could be computed using any of the methods known in the art.

Next, at step S30, an original spatial domain of the significance image is extracted. The original spatial domain is noted $\Omega$. The spatial domain is a domain (for instance a plane) where a digital image is defined by spatial coordinates (x,y in the case of 2D image, $x \in \mathbb{R}^d$ in the general case) of its pixels. As discussed, the spatial domain of the significance image may be the same as the spatial domain of the image I to resize. In the case where both spatial domains of the significance image and image I are the same, the pixel locations in both images represent the same spatial positions.

Then, at step S40, a transformation, noted $T_\theta$, is provided. $T_\theta$ is parameterized as an interpolating spline by a set of control points from the original spatial domain ($\Omega$) to a resized spatial domain ($\Omega'$).

The term transformation means an operator that is applied to the image I pixel positions and simply displaces the position of existing pixels of I, resulting in a resized image J. Hence, the transformation acts on the pixel coordinates, not their values. Any kind of transformation is possible, from a discrete transformation where only a subset of pixels coordinates of the image I to resize is concerned, to continuous transformation where all the pixels of the image I are concerned. The transformation is noted $T_\theta$, wherein T is meant to designate a transformation and $\theta$ is meant to designate the parameters of the transformation, as it will be explained latter.

For the sake of explanation, a mathematical definition the transformation $T_\theta$ is now discussed. An image transformation such as the transformation $T_\theta$ is a mapping from an input spatial domain $\Omega$ to an output spatial domain $\Omega'$. The input spatial domain $\Omega$ may be the original spatial domain of the significance image extracted at step S30. The output spatial domain $\Omega'$ can be the spatial domain of the resized image J. $\Omega'$ is a resized version of a $\Omega$. $\Omega$ and $\Omega'$ have the same density. The term density characterizes the type of values inside the space (real, quantified, integral, . . . ) but possibly with different bounds. The transformation has got all the properties of the mapping from $\Omega$ to $\Omega'$, i.e. if the mapping is linear then the transformation is said to be linear, if the mapping is continuous then the transformation is continuous.

The resized image J is defined as the image I to resize to which the transformation $T_\theta$ is applied. Hence, for all position x of the pixels in $\Omega$, one applies the following equation (equation 2):

$$J(T_\theta(x))=I(x)$$

In other words, in each new position $y=T_\theta(x)$ of a pixel, the value of I(x) is copied in J(y). The values of the pixels are not modified, only their positions can be modified. Pixels are moved 'forward' from the coordinate frame of the image to resize to the resized image; in this case a forward mapping is carried out, as illustrated on FIG. 7 wherein the shaded square illustrates empty pixel because the transformation maps to non-integral positions in the new image.

Interestingly, the transformation $T_\theta$ may be invertible. That is, the transformation can be inverted. In this case, for all position x in the spatial domain $\Omega$ of the image I to resize, one applies the following equation (equation 3):

$$J(x)=I(T_\theta^{-1}(x))$$

As a result of equation 3, every pixel in the resized image J will be assigned a position in the image I. Pixels are moved 'backward' from the coordinate frame of the resized image J to the image to resize J; in this case a backward mapping is carried out, as illustrated on FIG. 8. This backward mapping can be performed because an interpolation scheme is possible when dealing with non-integer positions in the original position space. In practice, any transformation inversion scheme may be used. For instance, the inversion scheme discussed in Gary E. Christensen, Hans J. Johnson: *Consistent Image Registration. IEEE Trans. Med. Imaging* 20(7): 568-582 (2001) may be used.

The transformation $T_\theta$ provided at step S40 may be a diffeomorphic transformation $T_\theta$. A diffeomorphic transformation is a transformation that is continuous, bijective, differentiable, of bijective derivative, the inverse of which is also continuous and differentiable. Advantageously, a diffeomorphic transformation transforms the image to resize in a smooth manner without creating any artifacts even in the derivatives of the image to resize. This is opposed to a piecewise smooth transformation, wherein the input spatial domain $\Omega$ is partitioned, that creates artifacts on the edges of the partitions. Each of these artifacts creates high frequencies that render the images less prone to compression. Another advantage of a diffeomorphic transformation is that the transformation is invertible: all the transformations that appear non-natural are discarded, thus avoiding the fold-over problem that is well known. Indeed, when the transformation is not invertible in one place, one can possibly obtain that two different pixel positions in the spatial domain $\Omega$ map to the same pixel position in the resized spatial domain $\Omega'$. It results in a visual effect of an image being fold over itself.

The transformation $T_\theta$ is parameterized. This means that the transformation is not made explicit on the whole spatial domain $\Omega$ because it is computationally impractical as spatial domain $\Omega$ may be very large (possibly infinite). The parameterized transformation can be evaluated in each and every position in $\Omega$, but for a limited number of parameters that is smaller than the cardinality of $\Omega$.

The transformation $T_\theta$ is parameterized as an interpolating spline. A spline, as known in the art, is a piecewise-defined polynomial function, depending on the degree of the spline, the degree of smoothness at the connection between pieces can be set. The degree of smoothness of the spline in the piece connections is also the overall degree of smoothness of the spline. Splines have control points, also called interpolation nodes. The displacement of the control points modifies the shape of the spline. Hence, transformation $T_\theta$ is parameterized by a set of control points of the interpolating spline that parameterizes $T_\theta$.

Any kind of spline can be considered for parameterizing the transformation function $T_\theta$. In practice, there are splines of particular interest for image processing such that, but not limited to:

Thin Plate Splines discussed in Bookstein, Fred L. "Principal warps: Thin-plate splines and the decomposition of deformations." In *IEEE Transactions on Pattern Analysis and Machine Intelligence archive*, Volume 11 Issue 6, June 1989, Page 567-585;

Free Form Deformations discussed in Sederberg, Thomas W., and Scott R. Parry. "Free-form deformation of solid geometric models." In Proceeding of SIGGRAPH '86 *Proceedings of the 13th annual conference on Computer graphics and interactive techniques*, Pages 151-160;

Non Uniform Rational B-splines or NURBS discussed in Piegl, Les A., and Wayne Tiller. "The NURBS book".

The transformation is a mapping from an input spatial domain $\Omega$ to an output spatial domain $\Omega'$. The transformation $T_\theta$ may be, for each pixel, the sum of the pixel position x and its displacement $u_\theta(x)$ where $u_\theta$ a mapping from $\Omega$ to $\Omega$ is '. For all position x in $\Omega$, the transformation $T_\theta$ can be represented by the following equation (equation 4):

$$T_\theta = x + u_\theta(x)$$

Using this representation of the transformation $T_\theta$ advantageously allows representing $T_\theta$ in terms of displacements of pixels, without loss of generality. The transformation is decomposed into the component associated to its position and the actual displacement of the pixel position, transformation can be quite large even when the displacement is small (on large domains).

Referring now to FIG. 9, where is illustrated an example of a set of control points defined over the original spatial domain $\Omega$ extracted from the significance image. Incidentally, one can notice that several control points are outside original spatial domain $\Omega$. In this example, the original spatial domain $\Omega$ is of dimension d=2 and is represented by the shaded rectangle. The set of control points controls the parameters of the interpolating spline that parameters the transformation $T_\theta$ and they are represented by the black dots. For the sake of explanation only, the discussion focusses on Free Form Deformations (FFD) interpolation spline.

The position of each control point positions can be denoted as $\theta(i,j)$ where $\theta(i,j)$ is a 2D vector representing the position of the (i,j) control point. The control points are arbitrarily indexed from left to right and from top to bottom with indices i and j respectively. The spacing between two control points in the horizontal direction can be denoted as $s_w$ and in the vertical direction as $s_h$, in the same fashion the projection of the position x in the original spatial domain $\Omega$ on the horizontal axis as $x_w$ and the projection of the position x in the original spatial domain $\Omega$ on the vertical axis as $x_h$. The spatial domain of the image I to resize is also considered as being oriented from left to right and from top to bottom. The horizontal and vertical directions are arbitrarily chosen and may be defined using a reference frame (x,y). For instance, in FIG. 9, a reference frame is represented by two arrows having a common origin, which is located on the top-left corner of a Hence, in FIG. 9, the x-axis represents the horizontal direction, and the y-axis represents the vertical direction.

Still in reference to FIG. 9, the set of control points forms a regular grid wherein the control points are uniformly spread over the original spatial domain $\Omega$. The grid of control points has been obtained from FFD; 2D Bezier interpolation splines have been computed that are, depending on the degree of the spline, supported by four control points in this example. The term regular grid involves that the value of the original horizontal spacing $s_w$ between two control points is always the same. Similarly, the value of the original vertical spacing $s_h$ between two control points is always the same. The horizontal spacing $s_w$ may have the same value as the vertical spacing $s_h$, as shown on FIG. 9. It is to be understood that the control points of a set of control points of FIG. 9 may be moved during the process of the invention, as it will be explained below.

Interestingly, the set of control points creates a new domain that is defined over the original spatial domain $\Omega$. This new domain is named $\Lambda$ and is discussed latter. $\Lambda$ acts on $\Omega$, which means that the displacement of a control point (for instance the control point 100 in FIG. 10) will affect the spline that, in turn, will locally affect $\Omega$.

As previously discussed, the transformation $T_\theta$ is a mapping from an input spatial domain $\Omega$ to an output spatial domain $\Omega'$, the transition from $\Omega$ to $\Omega'$ being the sum of the pixel position x and its displacement $u_\theta(x)$. From any pixel position, the displacement function $u_\theta(x)$ may be obtained from the control point positions. Hence, the displacement function $u_\theta$ of equation 4 may be defined as weighted linear combination of the control points' positions, as shown in the following equation 5:

$$u_\theta(x) = \sum_{k=0}^{3} \sum_{l=0}^{3} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right) \theta\left(\frac{x_w}{s_w} + k, \frac{x_h}{s_h} + l\right)$$

In equation 5, the representation of FFD uses Cubic B-Splines: the functions $B^k$ and $B^l$ are Cubic B-splines which also coincide with the Bernstein polynomials of the same degree, as known in the art. One understands any B-Splines of a different degree can be used and that the present invention is not limited to B-Splines of third degree. The invention is not limited to B-Splines which are linked to FFD, but any kind of spline as previously discussed.

As previously discussed, the position of each control point can be noted $\theta(i,j)$. In equation 5, $\theta$ is a function that represents the set of control points of the parameterized transformation. In particular, the function $\theta$ is the sole parameter of the transformation $T_\theta$: indeed, the knowledge of $\theta$ allows to completely describe the displacement $u_\theta$ and hence the transformation $T_\theta$. As a result, the displacement of a control point in the grid will change the transformation $T_\theta$ accordingly. The displacement of a control point only affects a local part of the spatial domain $\Omega$: indeed, as described by the equation 5, only the pixel positions x in $\Omega$ in a neighborhood of a size $4s_h \times 4s_w$ around the control point's position are affected by its movement. One understands that the neighborhood size might be different with lesser degree B-Splines.

FFD based on cubic B-splines of the equation 5 are by design smooth to the third degree; the degree is smaller when the order of the Bernstein Polynomial is lower. Invertibility and bijectivity of the displacement and its first derivative is achieved through a constraint on the control point displacement: the transformation resulting from the FFD displacement is diffeomorphic if the displacement of the control point is less than 0.48 times the control point's spacing $s_h$ and $s_w$; this results is known in the art, e.g. in Lee, Seungyong, et al. "Image metamorphosis with scattered feature constraints." in *IEEE Transactions on Visualization and Computer Graphics archive*, Volume 2 Issue 4, December 1996, Page 337-354. Hence, the displacement of positions x in Ω resulting from the movement of the control points will follow the displacement of the control points. As a result, getting two control points close together will reduce the image in between the control point's locations, while expanding the space between control points will enlarge the image in between the control point's locations. It is to be understood that the surrounding areas ($4s_h \times 4s_w$) of the displaced positions x in Ω is also affected in order to keep the continuity in the transformation.

Referring back to FIG. 1, at step S50, the original spatial domain Ω is subdivided into cells. Each cell is defined by a subset of control points of the set. Hence, the term cell defines a sub-part of the resized spatial domain Ω', and this sub-part is delimited by a subset of control points. A cell is a closed surface delimited by edges connecting control points of the set. The set of cell forms a spatial domain over the spatial domain Ω. A cell being a closed surface, this involves that a cell is formed by at least three control points.

In FIG. 9, a cell 90 is defined by four edges connecting the four control points. Two diagonal edges, which are within the closed surface of the cell 90, are not represented; these two edges do not contribute to delimit the closed surface of the cell. Still in reference to FIG. 9, the control points form a regular grid of cells; for instance, the cell 90, which is defined by four control points, is a polygon delimited by four control points. It is to be understood that the set of control points do not necessarily form a regular grid; for instance, a cell of more or less than four control points may be used.

The grid obtained from the set of control points can be contemplated as the representation of the coordinates of control points in the spatial domain Ω.

The control points are not defined in the spatial domain Ω, but the position of some control points overlaps with the spatial domain Ω, the cells are defined in the spatial domain Ω using the control points overlapping with Ω.

The set of cells may be seen as a layer over the original spatial domain Ω. Each cell is associated with one or more pixels of the original spatial domain Ω: the area formed by each cell covers one or more pixels. Ω and Λ are not dissociated, Λ is a subdivision of Ω. In the case where Λ is a regular grid of 4 cells over Ω we have the cells indices (0, 0), (0, 1), (1, 0) and (1, 1), and each cell is a subdomain of Ω, e.g. the cell (0,0) contains $$\left[0, 1, \ldots, \left(\frac{m}{2}\right) - 1\right] \times \left[0, 1, \ldots, \left(\frac{n}{2}\right) - 1\right]$$

from Ω. This amounts to say that polygons are drawn on the image, and every pixel in the polygon belongs to the cell.

Reducing the size of a cell, i.e. reducing its surface area is the same as bringing the control points surrounding the cell close together and hence the same as reducing the image domain at the cell's location. This is also true in the case of an augmentation of the cell's size. The image domain actually behaves the same way the cells are deformed. And if the control points that are defined outside the spatial domain Ω are clamped to stay at a distance $s_w$ and $s_h$ of the control points located inside the spatial domain Ω, then the spatial domain Ω' of the output image domain will have the same area as the cumulated area of the inner cells. One understands that the number of control points that need to be clamped will depend on the degree of the spline. This results from the transformation $T_θ$ defined in the equation 4.

At step S50, a set of cell subdividing the original spatial domain Ω has been determined. This set of cells defines a discrete domain of the original spatial domain Ω, noted Λ. Each cell can be considered the same way as a pixel location for an image and can be indexed in the same fashion. For instance, if four cells have been defined on the spatial domain Ω of Equation 1, then the four cells are respectively indexed (0, 0), (0, 1), (1, 0) and (1, 1), and each cell is a subdomain of Ω, e.g. the cell (0,0) contains [0, 1, . . . , (m/2)−1]×[0, 1, . . . , (n/2)−1] from Ω.

Then, at step S60, a weighted average of the significance of the pixels in a cell is computed for each cell of Λ. Consequently, the significance over Λ is defined. A Summary Image S is formed from the set of cells forming Λ: each cell of the Summary image can be contemplated as being a pixel of the Summary Image.

Since Λ is made of partitions of Ω, the domain Λ can be written $Λ=\{Ω_{(0,0)}, Ω_{(0,1)}, \ldots, Ω_{(K,L)}\}$ where K and L are the number of partitions in each directions of Ω, and $ω_{(i,j)}$ is a partition of Ω, the domain covered by the cell (i,j). The horizontal and vertical directions of Ω may be arbitrarily chosen and may be defined using a reference frame (x,y), as already discussed.

The weighted average is computed using the interpolating spline. Indeed, for each y=(i,j) position in Λ, it is possible to define the summary image for cubic B-splines FFD. The summary image SI can be defined by the equation 6:

$$SI(y) = \sum_{k=0}^{3} \sum_{l=0}^{3} \int_{\Omega'_{(i,j)}} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right) S(x)\, dx$$

wherein S(x) is the function that represents the provided significance image.

Figure 5:
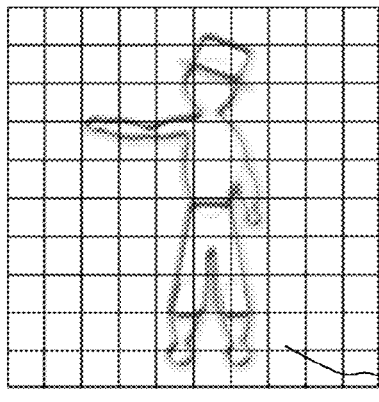
FIGS. 5 and 6 show an example of the summary image computation.

Referring now to FIG. 5, it is shown the significance image of the image of FIG. 4 on which a set of cell defines a discrete domain Λ of the original spatial domain Ω. The domain Λ is laid over the original spatial domain Ω of the significance image. In FIG. 5, the domain Λ completely covers the original spatial domain Ω of FIG. 4. Furthermore the set of cells has been obtained from a set of control points forming a grid of control points uniformly spread over the original spatial domain Ω, as discussed in reference to FIG. 9.

Figure 6:
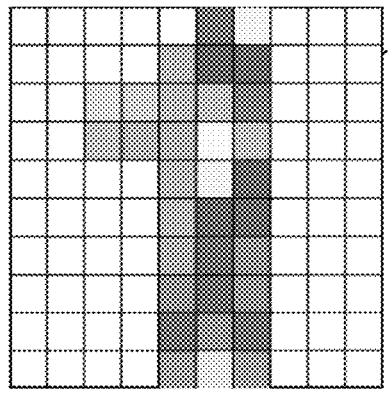

Referring now to FIG. 6, it is shown a Summary Image computed from the set of cells forming Λ, a weighted average of the significance of the pixels in a cell has been computed for each cell. Each cell of the Summary image is colored using a gray scale used for representing the significance of a cell, and therefore the significance of a set of pixel comprised in the cell. For instance, the areas on the left and the right of the character are represented in white, thus meaning these areas are not significant for the visual understanding of the scene.

Back to the flowchart of FIG. 1, at step S70, the cells of the original spatial domain Ω are deformed by displacing one or more control points of the cells having a lesser weighted average.

One algorithm amongst the algorithms known to be used in the field of content aware algorithm for removing or adding pixels for resizing an image may be applied directly to the summary image, excepted that these algorithms will operate on cells (that is, groups of control points) instead on pixels. These algorithms are guided by the image significance and will tune the transformation parameters to change the image according to some optimality constraint while changing the image summary the least. Optimality constraints include the fact that the image should keep straight edges but may also include constraints to distort the least the image (with same resulting image significance cost, several transformations are still possible depending on the parameter space size, adding these constraints allows to choose among the possible transformations parameters and hence transformations the most suitable).

Operating on the cells involves that the algorithm (i) identifies one or more cells with lesser weighted average, and (ii) modify the size of the identified cells (instead of removing or adding pixels as done by these algorithms). The size of the corresponding cells will be modified, as previously discussed:

a) the size of a cell is reduced when said cell has been identified by the algorithm as having to be removed;
b) the size of a cell is increased when said cell has been identified by the algorithm as a pixel having to be added. In practice, the resizing of the cells may be done up to 0.48 times the control point's spacing in order to keep the diffeomorphicity of the transformation.

Then, at step S80, the transformation $T_\theta$ is computed over a spatial domain of the image I using the displaced one or more control points. The function θ of function that represents the set of control points of the parameterized transformation, and the function θ is the sole parameter of the transformation $T_\theta$. Hence, once the control points have been displaced, as performed at step S70, the parameters of the transformations $T_\theta$ are set. It is therefore possible to compute the transformation $T_\theta$ as defined in equation 5.

Finally, at step S90, a resized image J is computed by applying the computed transformation $T_\theta$ to the spatial domain of the image I to resize. The resized image is defined on the resized spatial domain $\Omega'$. Applying the computed transformation $T_\theta$ means that the mapping from the input spatial domain $\Omega$ of the image I to an output spatial domain $\Omega'$ of the image J is carried out: the position of each pixel is modified in accordance with the equation 3 and 4.

Figure 2:
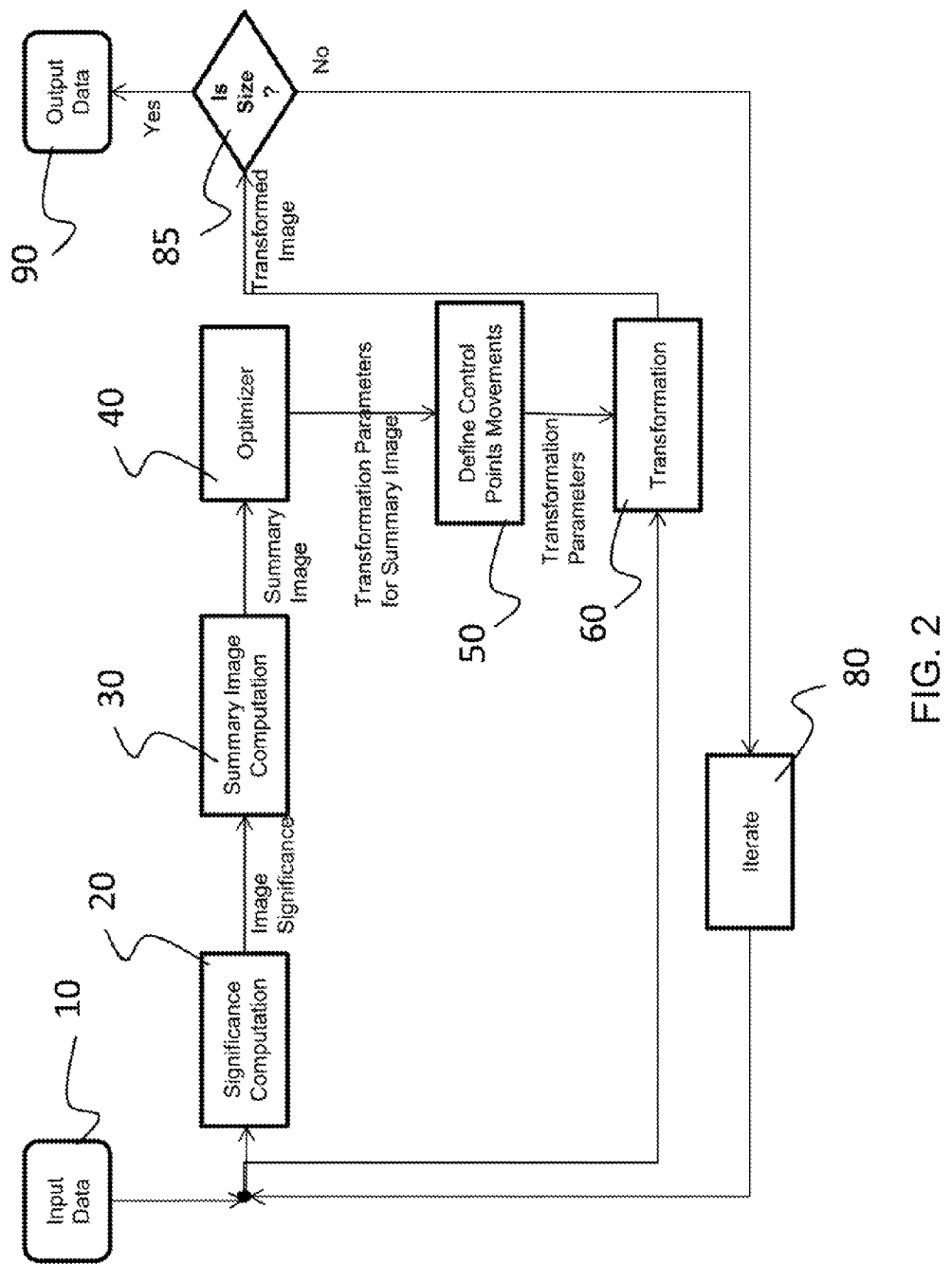
FIG. 2 shows an example of computational modules of a computer program for performing content aware image retargeting according to the invention.

Referring now to FIG. 2, it is shown an example of computational modules of a computer program for performing a resizing of an image according to the invention. Each modules comprises instructions executable by a computer, e.g the computer system of FIG. 17.

Figure 11:
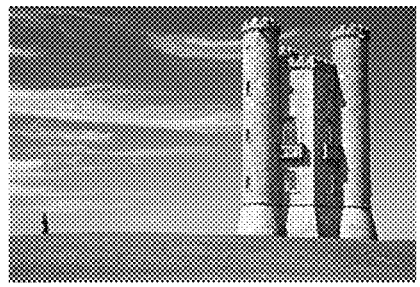
FIG. 11 shows an original image I to resize.
Figure 12:
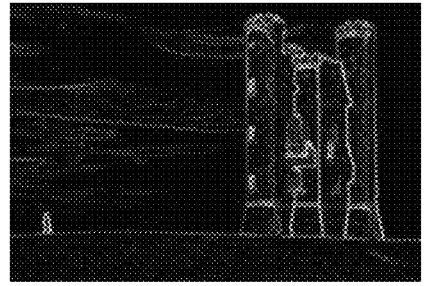
FIG. 12 shows the significance image of the image of FIG. 11.

A significance computation module 20 takes as input an image I to resize (step S10). The image I to resize can be, for instance, the image of FIG. 11. The module 20 computes a significance of each pixel of the image I. The output of the module provides the image significance of the image I in accordance with step S20. FIG. 12 shows an example of the significance image of the image of FIG. 11.

Figure 13:
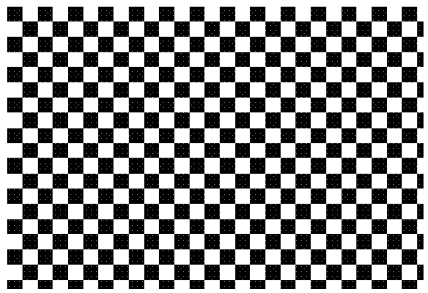
FIG. 13 shows a B-spline interpolation grid used to encode the transformation.
Figure 14:
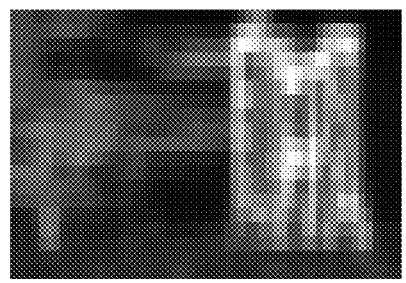
FIG. 14 shows a summary image of the significance image of FIG. 12.

A summary image computation module 30 takes as input the output of the module 20 and computes a summary image in accordance with the steps S30 to S60. FIG. 14 shows an example of the summary image computed by the module 30 from the significance image of FIG. 12. Thus, the module 30 computes set of control points of the interpolating spline that parameterizes the transformation $T_\theta$. The summary image computation module 30 may implement several kind of interpolation spline function; the selection of one spline function may be performed upon user action, or by default. The set of control points obtained from the interpolation spline may be represented as a grid, e.g. the regular grid wherein the control points are uniformly spread over the original spatial domain $\Omega$ of the input image of FIG. 11, as illustrated on FIG. 13.

An optimizer module 40 takes as input the summary image. The optimizer module returns which pixel of the summary image should be deleted or added.

The optimizer module 40 is the computational module that links the image significance to the summary image transformation definition. It implements one or more known algorithms dedicated to the removal or addition of pixels in the field of content aware algorithm. It is to be understood that any algorithm able to identify one or more cells with lesser weighted average and make the decision to modify the size of the identified cells can be used. Thus, this module provides transformation parameters of the Summary Image. The selection of one algorithm among several one may be performed upon user action, or by default.

Figure 15:
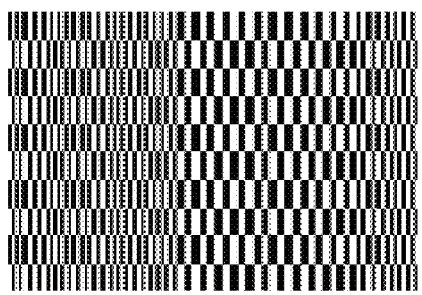
FIG. 15 shows an example of the grid of FIG. 13 that has been deformed by reducing grid columns with largest significance.

A control points movements module 50 defines displacements of one or more control points, as defined at step S70, and further computes the transformation $T_\theta$ (step S80). The output of this module comprises transformation parameters of the computed transformation. These transformation parameters form a modified grid such as the one shown on FIG. 15. This module 50 deduces the control point positions from the output of the module 40, that is, from which pixel of the summary image should be deleted or added.

Figure 16:
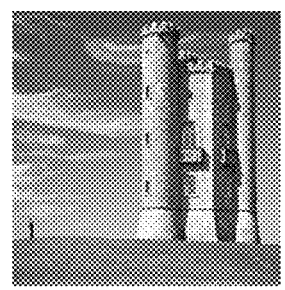
FIG. 16 shows the resized image obtained by applying the transformation on the an original image I of FIG. 11.

A transformation module 60 applies the computed transformation $T_\theta$ on the spatial domain of the image I to resize (step S90). The output of the transformation module is a resized image J, e.g. the image of FIG. 16.

It is then checked 85 whether the new size of the image I complies with the expected size, in practice it is possible to check for the expected dimension of the transformed image without computing the transformed image. In the event the resized image complies with the expected size, the output of the transformation module 60 is considered as being the new resized image J. In the event the resized image does not comply with the expected size, the whole process (steps S20 to S80) is repeated with new transformation parameters: new displacements of control points are decided by the control point movements module 50 in collaboration with the optimizer module 40.

Depending on the algorithm used by the optimizer module 40, then either only one pass is required, and no iterations 80 are done, or if the desired size is not attained in one step, then further iterations 80 are performed until the desired size is reached.

Interestingly, the Image Significance can be recomputed at any time with the current displaced grid if the algorithm that is used in the optimizer module 40 needs to recompute the Image Significance. The final image is only computed once in the end when the obtained transformation is applied to the original image.

The present invention advantageously allows reusing some computational modules already in use with current content aware image retargeting such as the one described in *Seam carving for content-aware image resizing*. Existing significance computation module 20, optimizer module 40 and transformation module 60 might be reused. This advantageously limits development costs and eases the integration of the invention with current content aware image retargeting softwares.

The preferred embodiment of the present invention has been described. It will be understood that various modifications may be made without departing from the spirit and scope of the invention. Therefore, other implementations are within the scope of the following claims. For instance, multi-scale/multi-resolution approaches that increase the computational speed (as described in Lee, Seungyong, George Wolberg, and Sung Yong Shin. "Scattered data interpolation with multilevel B-splines", In *IEEE Transactions on Visualization and Computer Graphics*, Volume 3 Issue 3, July 1997, Page 228-244) can be also used in the present invention without any modification to the algorithm; the image significance only needs to be recomputed after each new scale/resolution level.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for resizing an image I, the method comprising the steps of:
    providing (S10) the image I to resize;
    providing an image significance (S20) by computing a significance of each pixel in the image to resize;
    extracting (S30) an original spatial domain ($\Omega$) of the significance image;
    providing (S40) a transformation $T_\theta$, parameterized as an interpolating spline by a set of control points, from the original spatial domain ($\Omega$) to a resized spatial domain ($\Omega'$);
    subdividing (S50) the original spatial domain ($\Omega$) into cells, each cell being defined by a subset of control points of the set;
    computing (S60), for each cell, a weighted average of the significance of the pixels in the cell, the weighted average being computed using the interpolating spline;
    deforming (S70) the cells of the original spatial domain ($\Omega$) by displacing one or more control points of the cells having a lesser weighted average;
    computing (S80) the transformation $T_\theta$ over a spatial domain of the image I using the displaced one or more control points; and
    computing (S90) a resized image J by applying the computed transformation $T_\theta$ to the spatial domain of the image I to resize.

2. The computer-implemented method of claim 1, wherein the provided transformation $T_\theta$ is a diffeomorphic transformation $T_\theta$ such that $J(x)=I(T_\theta^{-1}(x))$, wherein 1 is the image to be resized, J is the resized image, x is the position of a given pixel in the original spatial domain ($\Omega$).

3. The computer-implemented method of claim 2, wherein the diffeomorphic transformation $T_\theta$ is defined by the equation $T_\theta=x+u_\theta(x)$, wherein x is the position of a given pixel in the original spatial domain ($\Omega$), and $u_\theta(x)$ is a displacement function wherein u is a mapping from the original spatial domain ($\Omega$) to the resized spatial domain ($\Omega'$).

4. The computer-implemented method of claim 3, wherein the transformation $T_\theta$ is parameterized as a free form deformation interpolating spline, and wherein displacement function $u_\theta(x)$ is defined by the equation $$u_\theta(x) = \sum_{k=0}^{3}\sum_{l=0}^{3} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right) \theta\left(\frac{x_w}{s_w} + k, \frac{x_h}{s_h} + l\right)$$

wherein $B^0, B^1, B^2, B^3$ are Cubic B-splines functions, $\theta$ is a function representing the control points, $s_w$ is the spacing between two control points in an horizontal direction, $s_h$ is the spacing between two control points in a vertical direction, $x_w$ is the position of a pixel in the original spatial domain ($\Omega$) on an horizontal axis, $x_h$ is the position of a pixel in the original spatial domain ($\Omega$) on a vertical axis.

5. The computer-implemented method of claim 4, wherein the set of control points form a grid and $\theta$ is the function representing the grid of control points.

6. The computer-implemented method of claim 4, wherein the step of computing, for each cell, a weighted average of the significance of the pixels in the cell is carried out with the function $$SI(y) = \sum_{k=0}^{3}\sum_{l=0}^{3} \int_{\Omega_{(i,j)}} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right) S(x)\, dx,$$

wherein $\Omega_{(i,j)}$ is a partition of the original spatial domain ($\Omega$), $S(x)$ represents the provided significance image.

7. The computer-implemented method of claim 6, wherein the partition $\Omega_{(i,j)}$ is the domain covered by the cells.

8. The computer-implemented method of claim 1, wherein the original spatial domain ($\Omega$) extracted from the significance image is the same as the spatial domain ($\Omega$) of the image I to resize.

9. The computer-implemented method of claim 1, wherein the step of computing a resized image J comprises reducing or increasing the image size.

10. A computer program product comprising:
    a non-transitory computer readable storage medium having thereon a computer program for resizing an image I; and
    computer instructions embodied on the computer readable storage medium supporting execution of the computer program by a processor and causing the processor to:
    provide the image I to resize;
    provide an image significance by computing a significance of each pixel in the image to resize;
    extract an original spatial domain ($\Omega$) of the significance image;
    provide a transformation $T_\theta$, parameterized as an interpolating spline by a set of control points, from the original spatial domain ($\Omega$) to a resized spatial domain ($\Omega'$);
    subdivide the original spatial domain ($\Omega$) into cells, each cell being defined by a subset of control points of the set;
    compute, for each cell, a weighted average of the significance of the pixels in the cell, the weighted average being computed using the interpolating spline;
    deform the cells of the original spatial domain ($\Omega$) by displacing one or more control points of the cells having a lesser weighted average;
    compute the transformation $T_\theta$ over a spatial domain of the image I using the displaced one or more control points; and
    compute a resized image J by applying the computed transformation $T_\theta$ to the spatial domain of the image I to resize.

11. A computer system comprising:
    a processor; and a memory, the processor being operatively coupled to the memory and the memory having recorded thereon instructions configuring the processor to implement a resizing of an image I by:

providing the image I to resize;

providing an image significance by computing a significance of each pixel in the image to resize;

extracting an original spatial domain (Ω) of the significance image;

providing a transformation $T_\theta$, parameterized as an interpolating spline by a set of control points, from the original spatial domain (Ω) to a resized spatial domain (Ω');

subdividing the original spatial domain (Ω) into cells, each cell being defined by a subset of control points of the set;

computing, for each cell, a weighted average of the significance of the pixels in the cell, the weighted average being computed using the interpolating spline;

deforming the cells of the original spatial domain (Ω) by displacing one or more control points of the cells having a lesser weighted average;

computing the transformation $T_\theta$ over a spatial domain of the image using the displaced one or more control points; and computing a resized image J by applying the computed transformation $T_\theta$ to the spatial domain of the image I to resize.

12. The computer system as claimed in claim 11, wherein the provided transformation $T_\theta$ is a diffeomorphic transformation $T_\theta$ such that $J(x)=I(T_\theta^{-1}(x))$, wherein I is the image to be resized, J is the resized image, x is the position of a given pixel in the original spatial domain (Ω).

13. The computer system as claimed in claim 12, wherein the diffeomorphic transformation $T_\theta$ is defined by the equation $T_\theta = x + u_\theta(x)$, wherein x is the position of a given pixel in the original spatial domain (Ω), and $u_\theta(x)$ is a displacement function wherein u is a mapping from the original spatial domain (Ω) to the resized spatial domain (Ω').

14. The computer system as claimed in claim 13, wherein the transformation $T_\theta$ is parameterized as a free form deformation interpolating spline, and wherein displacement function $u_\theta(x)$ is defined by the equation $$u_\theta(x) = \sum_{k=0}^{3}\sum_{l=0}^{3} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right)\theta\left(\frac{x_w}{s_w}+k, \frac{x_h}{s_h}+l\right)$$

wherein $B^0$, $B^1$, $B^2$, $B^3$ are Cubic B-splines functions, θ is a function representing the control points, $s_w$ is the spacing between two control points in an horizontal direction, $s_h$ is the spacing between two control points in a vertical direction, $x_w$ is the position of a pixel in the original spatial domain (Ω) on an horizontal axis, $x_h$ is the position of a pixel in the original spatial domain (Ω) on a vertical axis.

15. The computer system as claimed in claim 14, wherein the set of control points form a grid and θ is the function representing the grid of control points.

16. The computer system as claimed in claim 14, wherein the step of computing, for each cell, a weighted average of the significance of the pixels in the cell is carried out with the function $$SI(y) = \sum_{k=0}^{3}\sum_{l=0}^{3} \int_{\Omega_{(i,j)}} B^k\left(\frac{x_w}{s_w} - \left\lfloor\frac{x_w}{s_w}\right\rfloor\right) B^l\left(\frac{x_h}{s_h} - \left\lfloor\frac{x_h}{s_h}\right\rfloor\right) S(x)\,dx,$$

wherein $\Omega_{(i,j)}$ is a partition of the original spatial domain (Ω), S(x) represents the provided significance image.

17. The computer system as claimed in claim 16, wherein the partition $\Omega_{(i,j)}$ is the domain covered by the cells.

18. The computer system as claimed in claim 11, wherein the original spatial domain (Ω) extracted from the significance image is the same as the spatial domain (Ω) of the image I to resize.

19. The computer system as claimed in claim 11, wherein the step of computing a resized image J comprises reducing or increasing the image size.

* * * * *